United States Patent
Kohn

[11] Patent Number: 5,261,756
[45] Date of Patent: Nov. 16, 1993

[54] HULA HOOP CONNECTOR

[75] Inventor: Peter S. Kohn, Bronx, N.Y.

[73] Assignee: Majestic Extruders, Inc., Bronx, N.Y.

[21] Appl. No.: 951,303

[22] Filed: Sep. 17, 1992

[51] Int. Cl.$^5$ .............................................. F16B 2/00
[52] U.S. Cl. .................................... 403/298; 403/292
[58] Field of Search ................ 403/298, 292; 24/31 B

[56]  References Cited

U.S. PATENT DOCUMENTS

| | | | |
|---|---|---|---|
| 3,501,971 | 3/1970 | Peterson | 24/31 B |
| 3,767,233 | 10/1973 | Hodge | 403/292 X |
| 4,068,346 | 1/1978 | Binder | 403/292 X |
| 4,128,356 | 12/1978 | Carlisle | 403/292 |
| 4,795,410 | 1/1989 | Alderfer | 403/298 X |

Primary Examiner—Randolph A. Reese
Assistant Examiner—Anthony Knight
Attorney, Agent, or Firm—Norman E. Lehrer; Bryan D. Rockwell

[57] ABSTRACT

A connector for joining the ends of pliable tubing which form a hula hoop. The connector is comprised of an elongated body with a plurality of conically tapered discs attached thereto and a circularly shaped center disc located at its lengthwise centerline. The connector is subtlety formed in the shape of the hula hoop arc. The tapered discs ar located in equal number on each side of the center disc. The large diameter of the tapered discs increases as the discs are positioned closer to the center disc. The large diameters of the discs are greater in size than the inside diameter of the tubing such that the tubing end must be force fit over the discs thus causing a secure connection. Upon attempted removal of the tubing, the large diameters of the tapered discs act as barbs which prevent accidental removal.

5 Claims, 1 Drawing Sheet

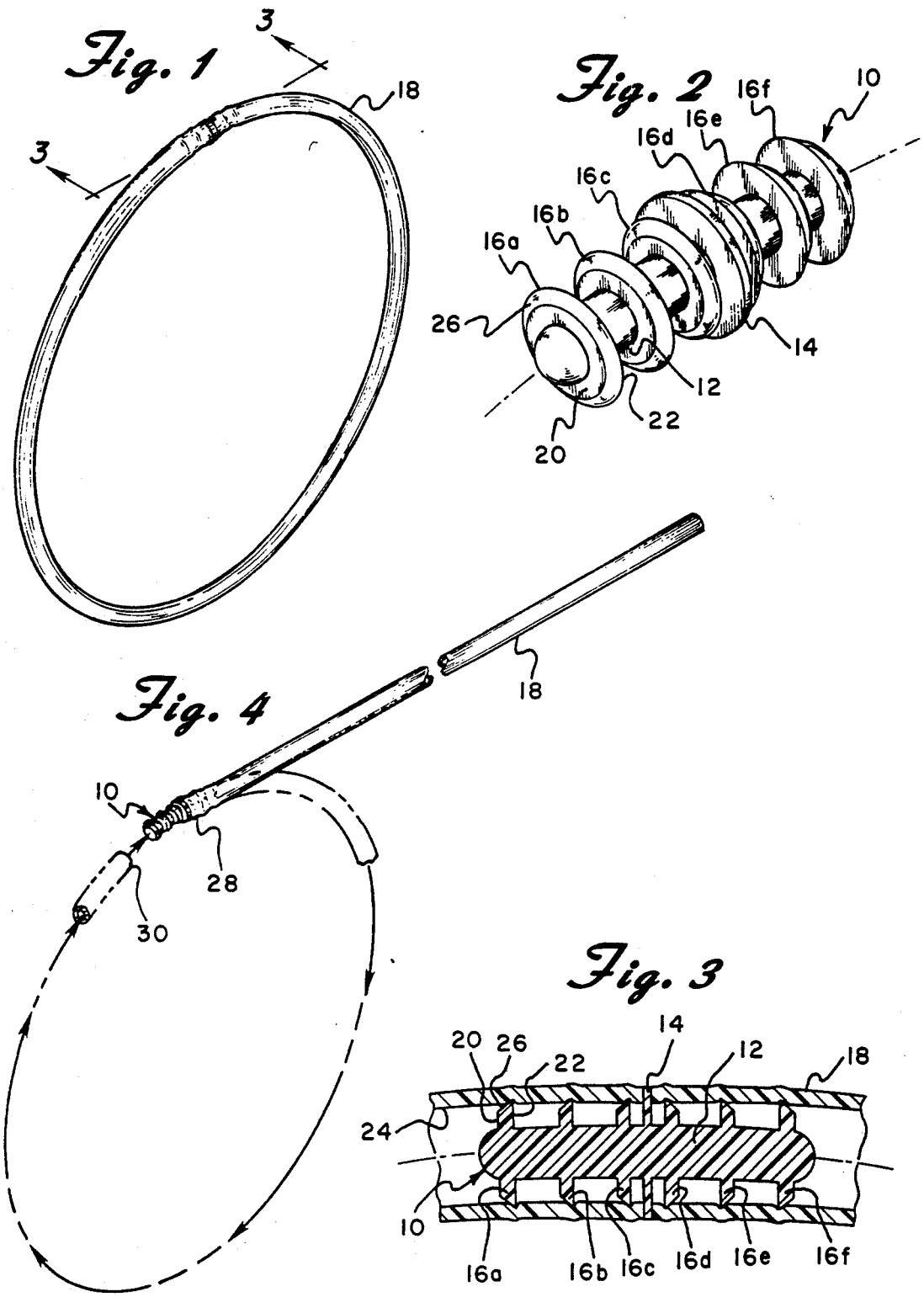

HULA HOOP CONNECTOR

BACKGROUND OF THE INVENTION

This invention relates to a recreational toy commonly known as the hula hoop and, more particularly, to a device for connecting the tubular ends of the hula hoop together.

Hula hoops are lightweight circular hoops constructed usually from tubular plastic. The hoop is a recreational toy of enduring popularity used simply by placing it at one's midsection and swiveling the hips like a hula dancer. The hoop spins around the hip area and the object is to keep it going as long as possible.

The hula hoop is formed from a straight yet flexible piece of tubing capable of being formed into a circle or hoop. Upon forming the tube into the hoop, the purpose of this invention emerges; the ends of the now formed hoop must be connected together to form the hula hoop.

The hoop ends are connected, most commonly, by use of a wooden dowel. The dowel is of substantially the same diameter as the inside diameter of the hoop tubing and is placed into each end of the adjoined tubing until the ends of the tubing are adjacent. A staple is then used at each end of the tubing to secure each tubing end to the wooden dowel thereby securing the tubing into a hoop.

Inherent problems with the currently used method of securing the hoop ends include its suspect security, referring to its frequent failure to cause the ends to remained secured, and safety concerns due to loosening staples having sharp, skin piercing ends. Staples do not effectively secure the tubing for an extended amount of time. This frequently causes the ends of the hula hoop to become undone causing an unusable C-shaped thing. Upon their loosening, the staples become exposed which can cause injury to the most notable and skilled users of hula hoops, children.

SUMMARY OF THE INVENTION

The invention described in this application is a connector for securing the ends of tubular plastic together for forming the popular toy, the hula hoop. The connector provides a safer and more secure method for adjoining the ends of the tubular material which forms the hula hoop.

In accordance with the invention, the connector comprises an elongated body, subtlety shaped in the form of the hula hoop arc, a plurality of conically tapered discs attached to the body, and a circularly shaped center disc located at the lengthwise center of the body. The tapered discs are adapted for forcibly fitting within the ends of the tubing and securing the tubing thereto.

The tapered discs are arranged in equal number on either side of the center disc. For example, there are three on either side of the center disc in the presently preferred embodiment. On each side of the center disc, the smaller end of the taper faces the end of the body.

The tapered discs become larger in diameter as they are located closer to the center disc. The large diameters are larger than the inside diameter of the tubing causing the tubing to be force fit over the disc and thereby creating the secure connection. The purpose of the graduated diameter discs is to allow the inside diameter of the tubing to gradually conform to the larger diameters as the connector is inserted. Upon attempted removal of the tubing from the connector, the larger diameters of the tapered discs act as barbs which makes accidental disconnection of the tubing ends very difficult.

BRIEF DESCRIPTION OF THE DRAWINGS

For the purposes of illustrating the invention, there is shown in the accompanying drawings one form which is presently preferred; it being understood that the invention is not intended to be limited to the precise arrangements and instrumentalities shown.

FIG. 1 is a perspective view of the hula hoop and connector showing the connector installed in the hula hoop and securing its ends;

FIG. 2 is a perspective view of the connector constructed in accordance with the present invention;

FIG. 3 is a cross-sectional view taken along line 3—3 of FIG. 1, and

FIG. 4 is an exploded view of the connector being installed into the hula hoop tubing and also showing the formation of the hoop.

DETAILED DESCRIPTION OF THE PREFERRED EMBODIMENT

Referring now to the drawings in detail wherein like reference numerals have been used throughout the various figures to designate like elements, there is shown in FIG. 2 a perspective view of the hoop connector constructed in accordance with the general principles of the present invention and designated generally as 10. The hoop connector 10 is comprised of a central body 12, a center disc 14, and a plurality of tapered discs 16a, 16b, 16c, 16d, 16e, and 16f. The center disc 14 is attached to the body at the lengthwise centerline of the body and the tapered discs 16a–16f are spaced along the body in equal numbers on each side of the center disc 14.

In the preferred embodiment, the connector is integrally molded from plastic. It should be understood, however, that other materials could be used. Referring to FIG. 2, the body 12 is slightly curved into the shape of the arc that the tubing 18 forms upon attachment of the ends via the connector 10. The curve allows for a more conforming fit between the connector 10 and the tubing 18. The body 12 is elongated and rounded with rounded ends. The center disc 14 is attached to the body. It is circular and has a diameter approximately equal to the outside diameter of the hoop tubing 18. Upon full insertion of the connector 10, the tubing ends abut the center disc 14 on both sides, as shown in FIG. 3.

The tapered discs 16a–f are similarly attached to the body 12. The tapered discs 16a–f and the center disc 14 may be either integrally formed with the body or constructed separately and subsequently attached to the body 12. In the preferred embodiment there are three tapered discs 16a–c and 16d–f on each side of the center disc, as shown in FIG. 2. Each tapered disc is conically tapered such that it is comprised of a small diameter which increases gradually to a large diameter.

For purposes of this description, only one tapered disc will be described with the understanding that the general description applies to all of the tapered discs.

The tapered disc 16a has a small diameter 20 and a large diameter 22. The small diameter 20 is less in diameter than the inside diameter 24 of the tubing 18, see FIG. 3. The diameter of the disc increases along the width of the tapered disc 16a until the maximum, large diameter 22 is reached. The large diameter 22 is slightly greater in size than the inside diameter 24 of the tubing 18. The tubing 18 is pliable enough, however, to accommodate the large diameter 22 upon insertion of the connector 10. The lesser diameters of the taper 26 allows the tubing 18 to gradually conform to the increasing diameters along the disc width.

More specifically, the large diameters, for example diameter 22, of the tapered discs increase as the tapered discs are located closer to the center disc as compared to those further away. For example, the diameter of tapered disc 16c is larger in diameter than tapered disc 16b, the diameter of disc 16b is larger than that of disc 16a. Similarly, the diameter of disc 16d is larger than disc 16e, and the diameter of disc 16e is larger than disc 16f. In addition, discs 16a and 16f are substantially equal in size, discs 16b and 16e are substantially equal in size, and discs 16c and 16d are substantially equal in size. The graduating of the discs by increasing diameters requires the tubing to conform slightly more along each taper for each subsequently tapered disc as the connector 10 is further inserted. This causes a tight and secure fit. After full insertion, as shown in FIG. 3, the large diameters have a barb-like effect on the inside diameter 24 of the tubing particularly upon attempted removal of the tubing from the connector. For each tapered disc, the small diameter side of the taper faces outward towards the end of the body 12 which is nearest to that particular tapered disc.

Referring now to FIG. 4, the connector 10 is installed and used by placing one end of the connector 10 into a tubing end 28. The tubing end 28 is pushed over the end of the connector 10 and forced over the tapered discs 16d-f until the tubing end 28 abuts the center disc 14. The tubing is then formed into a circular or hoop shape and the tubing end 30 is similarly forced over the other end of the connector 10, tapered discs 16a-c, until it abuts the center disc on the opposite side. The arc of the connector should conform to the arc of the hoop upon installation into the tube.

The present invention may be embodied in other specific forms without departing from the spirit or essential attributes thereof and accordingly reference should be made to the appended claims rather than to the foregoing specification as indicating the scope of the invention.

What is claimed is:

1. A connector for connecting ends of pliable tubing which forms a hula hoop, comprising:
   (a) an elongated body comprised of two symmetrical halves and a circularly-shaped center disk located at the lengthwise center of said elongated body, said body being slightly formed in the shape of an arc, said center disk having substantially the same diameter as the outside diameter of said tubing;
   (b) a plurality of radially extending circularly-shaped engaging disks attached to and spaced along the length of said body, said engaging disks being equally spaced along the length of said body on each side of said center disk and being equal in number on each side of said center disk, said engaging disks being adapted for fitting within the ends of said tubing for connecting the ends and forming a hoop;
   (c) each of said engaging disks having an outside diameter, said engaging disks being substantially graduated on said body by diameter size from each end of said connector, said engaging disks having smaller outside diameters being located towards the ends of said connector and said engaging disks having larger outside diameters being located towards the lengthwise center of said connector;
   (d) at least two of said engaging disks having outside diameters larger than the inside diameter of said tubing to facilitate a force fit between said connector and said tubing for securing said tubing to said connector, and
   (e) said engaging disks being conically tapered such that each engaging disk is comprised of a small and a large diameter side, said engaging disks being positioned on said body such that the small diameter sides of each particular engaging disk faces the end of said body to which said particular engaging disk is nearest.

2. The invention according to claim 1 wherein said connector is comprised of six disks.

3. The invention according to claim 1 wherein said discs are integral with said body of said connector.

4. The invention according to claim 1 wherein each of said discs are constructed separately from said body and secured thereto.

5. The invention according to claim 1 wherein said connector is constructed from plastic.

* * * * *